United States Patent
Fujioka

(10) Patent No.: US 11,028,829 B2
(45) Date of Patent: Jun. 8, 2021

(54) CONTROLLING WIND TURBINE BASED ON RAIN DROP SIZE

(71) Applicant: MHI VESTAS OFFSHORE WIND A/S, Aarhus N (DK)

(72) Inventor: Hideyasu Fujioka, Århus C (DK)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 126 days.

(21) Appl. No.: 16/461,574

(22) PCT Filed: Nov. 17, 2017

(86) PCT No.: PCT/DK2017/050379
§ 371 (c)(1),
(2) Date: May 16, 2019

(87) PCT Pub. No.: WO2018/091056
PCT Pub. Date: May 24, 2018

(65) Prior Publication Data
US 2019/0368468 A1    Dec. 5, 2019

(30) Foreign Application Priority Data
Nov. 18, 2016  (DK) .............................. PA201670916

(51) Int. Cl.
*F03D 7/02*    (2006.01)
*F03D 17/00*   (2016.01)
(Continued)

(52) U.S. Cl.
CPC ............. *F03D 7/0276* (2013.01); *F03D 1/00* (2013.01); *F03D 7/0224* (2013.01); *F03D 7/042* (2013.01);
(Continued)

(58) Field of Classification Search
CPC ............. F05B 2270/323; F03D 7/0268; F03D 7/0292; F03D 7/00–06
See application file for complete search history.

(56) References Cited

U.S. PATENT DOCUMENTS 5,313,202 A    5/1994  Hansman, Jr. et al.
6,837,681 B2 * 1/2005  Wobben ................ F03D 7/0276
                                                416/1
(Continued)

FOREIGN PATENT DOCUMENTS

CN    1329696 A     1/2002
CN    101960098 A   1/2011
(Continued)

OTHER PUBLICATIONS

Springer, G. Analysis of Rain Erosion of Coated Materials, 1973 (Year: 1973).*
(Continued)

*Primary Examiner* — Eldon T Brockman
*Assistant Examiner* — Topaz L. Elliott
(74) *Attorney, Agent, or Firm* — Patterson + Sheridan, LLP

(57) ABSTRACT

There is presented a method (320) for controlling a wind turbine (100), wherein said wind turbine comprises a wind turbine rotor (102) with one or more blades (103), wherein the wind turbine has a rated angular rotation speed (214) of the wind turbine rotor, said method comprising providing (322) an estimated drop size (324) of rain drops impinging on the one or more blades, determining (326) whether an entry criterion for operation according to a reduced mode is fulfilled, wherein said determining is based at least partially on the estimated drop size (324), controlling (328) the wind turbine according to the reduced mode if the entry criterion is fulfilled, wherein in the reduced mode an angular rotation speed of the wind turbine rotor is limited below an angular
(Continued)

rotation speed threshold (216), wherein the angular rotation speed threshold is smaller than the rated angular rotation speed of the wind turbine.

15 Claims, 3 Drawing Sheets

(51) Int. Cl.
*F03D 1/00* (2006.01)
*F03D 7/04* (2006.01)
*G01F 22/00* (2006.01)
*G01W 1/14* (2006.01)

(52) U.S. Cl.
CPC ........ *F03D 17/00* (2016.05); *F05B 2240/221* (2013.01); *F05B 2260/70* (2013.01); *F05B 2260/80* (2013.01); *F05B 2270/101* (2013.01); *F05B 2270/804* (2013.01); *G01F 22/00* (2013.01); *G01W 1/14* (2013.01)

(56) References Cited

U.S. PATENT DOCUMENTS

| | | | |
|---|---|---|---|
| 7,242,343 B1 | 7/2007 | Woodell | |
| 7,934,905 B2 * | 5/2011 | Eggleston | F03D 17/00 416/61 |
| 8,388,315 B2 * | 3/2013 | Haans | F03D 80/55 416/1 |
| 9,581,165 B2 * | 2/2017 | Babbitt | A01M 29/00 |
| 2003/0165379 A1 * | 9/2003 | Wobben | F03D 7/0264 415/1 |
| 2005/0082499 A1 | 4/2005 | Graves et al. | |
| 2010/0054940 A1 * | 3/2010 | Honhoff | F03D 7/022 416/31 |
| 2012/0061957 A1 * | 3/2012 | Steinmetz | F03D 7/043 290/44 |
| 2013/0280033 A1 * | 10/2013 | Babbitt | F03D 80/00 415/1 |
| 2014/0186188 A1 * | 7/2014 | Takeuchi | F03D 1/0675 416/224 |
| 2014/0358592 A1 * | 12/2014 | Wedig | G06Q 40/08 705/4 |
| 2015/0184631 A1 * | 7/2015 | Woo | F03D 80/80 290/44 |
| 2016/0101870 A1 * | 4/2016 | Leschi | B64C 13/04 701/3 |
| 2019/0345915 A1 * | 11/2019 | Picard | F03D 7/0276 |
| 2019/0368466 A1 * | 12/2019 | Fujioka | F03D 7/0224 |
| 2020/0056585 A1 * | 2/2020 | Messing | F03D 7/043 |

FOREIGN PATENT DOCUMENTS

| | | | | |
|---|---|---|---|---|
| CN | 201763508 U | 3/2011 | | |
| DE | 102014226979 A1 | 6/2016 | | |
| DK | 2673502 T3 | 8/2016 | | |
| EP | 1906192 A2 | 4/2008 | | |
| EP | 1959534 A1 | 8/2008 | | |
| JP | 2010065542 A | 3/2010 | | |
| WO | 0206095 A1 | 1/2002 | | |
| WO | WO-2012100783 A2 * | 8/2012 | ............ | F03D 15/00 |
| WO | 2016023554 A1 | 2/2016 | | |
| WO | 2016091056 A1 | 5/2018 | | |

OTHER PUBLICATIONS

Schmitt, G. Technical Report AFML-TR-79-4122: Liquid and Solid Particle Impact Erosion, 1979 (Year: 1979).*
Gohardani, O. Impact of Erosion Testing aspects on current and future flight conditions, Progress in Aerospace Sciences 47 (2011) 280-303. (Year: 2011).*
ASTM G73-10 Standard Test Method for Liquid Impingement Erosion Using Rotating Apparatus, 2012 (Year: 2012).*
Keegan, M. Wind Turbine Blade Leading Edge Erosion: An investigation of rain droplet and hailstone impact induced damage mechanisms. Doctoral Thesis, University of Strathclyde, 2014. (Year: 2014).*
Zhang, S. (2014). Accelerated rain erosion of wind turbine blade coatings. Danmarks Tekniske Universitet (DTU). (Year: 2014).*
Kreidler S., "How do you find the volume of a sphere using the diameter instead of the radius" retrieved from https://www.quora.com/How-do-you-find-the-volume-of-a-sphere-using-the-diameter-instead-of-the-radius (Year: 2017).*
Bech, J. "Extending the life of wind turbine blade leading edges by reducing the tip speed during extreme precipitation events", Wind Energ. Sci., 3, 729-748, 2018 https://doi.org/10.5194/wes-3-729-2018 (Year: 2018).*
"WIND turbine control strategies to reduce wind turbine blade Rain droplet Erosion (WINDCORE)" https://www.grow-offshorewind.nl/project/windcore (Year: 2020).*
Chinese Office Action for Application No. 2001780071397.5 dated Apr. 3, 2020.
Danish Patent and Trademark Office First Technical Examination for Application No. 2016P00130DK KH dated Mar. 31, 2017.
PCT International Search Report for Application No. PCT/DK2017/050379 dated May 2, 2018.
PCT Written Opinion of the International Searching Authority for Application No. PCT/DK2017/050379 dated May 2, 2018.

* cited by examiner

CONTROLLING WIND TURBINE BASED ON RAIN DROP SIZE

FIELD OF THE INVENTION

The present invention relates to a method for controlling a wind turbine, more particularly a method for controlling a wind turbine for avoiding rain induced mechanical damage of the blades, a corresponding control system, software and wind turbine.

BACKGROUND OF THE INVENTION

A wind turbine, such as an offshore wind turbine, as known in the art comprises a wind turbine tower and a rotor. The rotor comprises one or more rotor blades, which may suffer from mechanical damage caused by precipitation, such as rain.

U.S. Pat. No. 6,837,681 B2 describes that the rotor blades carried thereby of wind power installations are subjected to a particular degree to the ambient environmental influences such as for example rain, snow, hail or also insects. In particular the leading edges of the rotor blades are heavily loaded in that respect. In that situation it can happen that the rotor blades and in particular the leading edges thereof, after some time, suffer from (mechanical) damage, for which cost-intensive repair is necessary, especially as a crane is frequently required for that purpose and the entire wind power installation is also stopped for a prolonged period due to the repair and under some circumstances even individual rotor blades have to be transported away to the repair location. The object of U.S. Pat. No. 6,837,681 B2 is to reduce the erosion damage at the rotor blades and to avoid the above-mentioned disadvantages. U.S. Pat. No. 6,837,681 B2 describes a method of operating a wind power installation having at least one sensor for detecting the number and/or the speed and/or the impulse of particles which impinge on the sensor, with a data processing and control device for processing the measurement data detected by the sensor, wherein the rotary speed (which may be referred to interchangeably with angular rotation speed) of the rotor of the wind power installation is reduced (by means of the data processing/control device) and/or the wind power installation is stopped if a particle measurement value measured by the sensor is exceeded. However, that also results in a reduction in the total power which the wind power installation produces.

An improved method for operating a wind power installation would be advantageous, and it would in particular be advantageous with a method which enables reducing the mechanical damage and/or the reduction in the total power which the wind power installation produces.

The present invention may be applicable to offshore wind turbines.

SUMMARY OF THE INVENTION

It may be seen as an object of the present invention to provide a method for controlling a wind turbine that solves or mitigates the above mentioned problems, by reducing the mechanical damage and/or the reduction in the total power which the wind turbine produces.

The above described object is intended to be obtained in a first aspect of the invention by providing a method for controlling a wind turbine, such as a method for controlling a wind turbine and minimizing erosion, such as an offshore wind turbine, wherein said wind turbine comprises:

A wind turbine rotor with one or more blades, wherein the wind turbine has a rated angular rotation speed of the wind turbine rotor, said method comprising:

Providing an estimated drop size of rain drops impinging on the one or more blades, Determining whether an entry criterion for operation according to a reduced mode is fulfilled, wherein said determining is based at least partially on the estimated drop size, Controlling the wind turbine according to the reduced mode if the entry criterion is fulfilled, wherein in the reduced mode an angular rotation speed of the wind turbine rotor is limited below an angular rotation speed threshold, wherein the angular rotation speed threshold is smaller than the rated angular rotation speed of the wind turbine.

The invention is particularly, but not exclusively, advantageous for obtaining a method for minimizing erosion, and hence possibly extend blade leading edge protection (LEP) life time (which may in turn enable minimizing resources spent on blade repair and downtime), of the one or more wind turbine blades while simultaneously minimizing the drop in energy output, such as annual energy production, which is caused by the reduction in angular rotation speed. It may in particular be noted, that rain drop size may be seen as a relevant parameter for the mechanical damage (which may be referred to as erosion) caused by impinging rain drops, and that controlling the wind turbine based on the rain drop size may hence be an alternative to or superior to methods controlling the wind turbine in the absence of knowledge or estimates of the rain drop size. For example, incubation time depends on rain drop size as described in the formula elsewhere in the present application. Thus, with an estimated drop size, it is possible to avoid droplet erosion more effectively. For example, by knowing an estimated drop size value it may also be possible to estimate precipitation intensity and terminal velocity of the rain drops, which in turn will enable (assuming operation parameters of the wind turbine, such as angular rotation speed are also known) an incubation time, which may be relevant for deciding whether an entry criterion for operation according to a reduced mode is fulfilled.

By 'rain drop size' may be understood diameter of the individual rain drops, such as measured in units of millimeters. For non-spherical rain drops, the diameter d may be estimated from the volume V of a rain drop according to the formula:

$$d=(6*V/\pi)^{(1/3)}$$

By 'angular rotation speed (of the wind turbine rotor)' ($\omega$) may be understood the number of turns of the rotor divided by time at any given instant, which may be measured in radians per second (rad/s). The relation between angular rotation speed ($\omega$) and rotor tip speed (v) is given by $$v=r*\omega,$$

where r is the radius of the rotor. Angular rotation speed could alternatively be measured in revolutions per minute (rpm).

By 'rated angular rotation speed (of the wind turbine rotor)' ($\omega_{rated}$) may be understood the maximum allowed angular rotation speed (such as in the normal mode), which is a fixed value (as opposed to the angular rotation speed). The rated angular rotation speed may take on a fixed value, for example a value set when the turbine is designed.

By 'angular rotation speed threshold (of the wind turbine rotor)' ($\omega_{reduced}$) is understood the maximum allowed angular rotation speed (in reduced mode), which is a fixed value (as opposed to the angular rotation speed), which is smaller than the rated angular rotation speed. It is understood that the angular rotation speed threshold is a non-zero, such as a positive value larger than zero.

By 'providing an estimated drop size of rain drops impinging on the one or more blades' may be understood measuring or receiving an estimated drop size.

By 'determining whether an entry criterion for operation according to a reduced mode is fulfilled, wherein said determining is based at least partially on the estimated drop size' may be understood providing, such as calculating, a value based partially or fully on the estimated drop size and comparing that value to the entry size criterion.

By 'reduced mode' may be understood a mode according to which the wind turbine may be operated, which mode is different to at least one other mode, which at least one other mode may be referred to as a normal mode, wherein in the normal mode the angular rotation speed of the wind turbine rotor is limited by the rated angular rotation speed, but may take on values up to the rated angular rotation speed, such as values above the angular rotation speed threshold. In the reduced mode the angular rotation speed of the wind turbine rotor is limited by the angular rotation speed threshold, but may take on values up to the angular rotation speed threshold, such as values above zero angular rotation speed.

According to an embodiment, there is presented a method according to any one of the preceding claims, wherein the entry criterion is fulfilled if, such as if and only if, the estimated drop size is above a predetermined drop size entry threshold. A possible advantage of this embodiment is the simplicity afforded. It may be shown that incubation time decreases with increasing drop size, and therefore it may be advantageous to enter into reduced mode when drop size is above predetermined drop size entry threshold, such as a threshold, which corresponds to a predetermined incubation time threshold.

According to an embodiment, there is presented a method according to any one of the preceding claims, wherein the method further comprises:

Providing an estimated precipitation intensity of precipitation impinging on the wind turbine, wherein said determining is based at least partially on said estimated precipitation intensity. A possible advantage of this may be that incubation time may depend on a plurality of factors including (besides rain drop size) also precipitation intensity. Thus, providing estimates of both rain drop size and precipitation intensity may yield improved controlling of the wind turbine, for example due to more precise prediction of onset of erosion. More particularly, it may be an advantage to provide both estimated drop size and estimated precipitation intensity, because the remaining parameters in the formula for incubation time (described elsewhere in the present application) are either related to rain drop size (such as terminal velocity of rain drops) or is obtained as an operational parameter of the wind turbine (such as impact speed, which is related to, e.g., tip speed, which is in turn related to angular rotation speed). Therefore, rain drop size and precipitation intensity, being weather related parameters, which cannot be controlled, may advantageously be estimated.

All weather parameters in the incubation time formula are to some extent linked (drop size, terminal velocity, precipitation intensity), thus providing an estimated drop size may at least be seen as an alternative to providing estimates of terminal velocity and precipitation intensity. However, an advantage of providing both estimated drop size and estimated precipitation intensity may be that it enables dispensing with the need to rely on a somewhat uncertain relation (e.g., via a look-up table) between these two parameters, which in effect enables providing a better estimate of the incubation time.

By 'precipitation intensity' may be understood amount of rain per area per time unit, such as measured in units of height per time unit, such as mm per hour.

By 'providing an estimated precipitation intensity of precipitation impinging on the wind turbine' may be understood measuring or receiving estimated precipitation intensity.

In one embodiment of the invention, other types of aerial particles in addition to rain drops are also taken into account. Aerial particles here include rain drops, hail particles, snow particles, insects and birds (particularly larger groups of insects or birds, such as swarming grasshoppers or migrating birds), dust particles (such as sand particles, vulcanic ashes and pollution particles). For each type of aerial particle, the entry criterion of operating according to a reduced mode is based at least partially on the estimated particle size while optionally also taking into account the type of aerial particle. In this embodiment of the invention, similar aspects as herein mentioned for (rain) drops and (drop) size also may be taken into consideration for other types of aerial particles and aerial particle size. Particularly, the above described object is intended to be obtained in this embodiment of the first aspect of the invention by providing a method for controlling a wind turbine, such as a method for controlling a wind turbine and minimizing erosion, such as an offshore wind turbine, wherein said wind turbine comprises:

A wind turbine rotor with one or more blades, wherein the wind turbine has a rated angular rotation speed of the wind turbine rotor, said method comprising:

Providing an estimated aerial particle size of aerial particles impinging on the one or more blades, Determining whether an entry criterion for operation according to a reduced mode is fulfilled, wherein said determining is based at least partially on the estimated aerial particle size, Controlling the wind turbine according to the reduced mode if the entry criterion is fulfilled, wherein in the reduced mode an angular rotation speed of the wind turbine rotor is limited below an angular rotation speed threshold, wherein the angular rotation speed threshold is smaller than the rated angular rotation speed of the wind turbine.

In a second aspect, the invention relates to a computer program product having instructions which, when executed by one or more processors causes a computing device or a control system for a wind turbine to perform the method according to the first aspect.

In a third aspect, the invention relates to a control system for a wind turbine being arranged for carrying out the method according to the first aspect.

In a fourth aspect, the invention relates to a wind turbine, such as an offshore wind turbine, comprising the control system according to the third aspect.

Many of the attendant features will be more readily appreciated as the same become better understood by reference to the following detailed description considered in connection with the accompanying drawings. The preferred features may be combined as appropriate, as would be

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
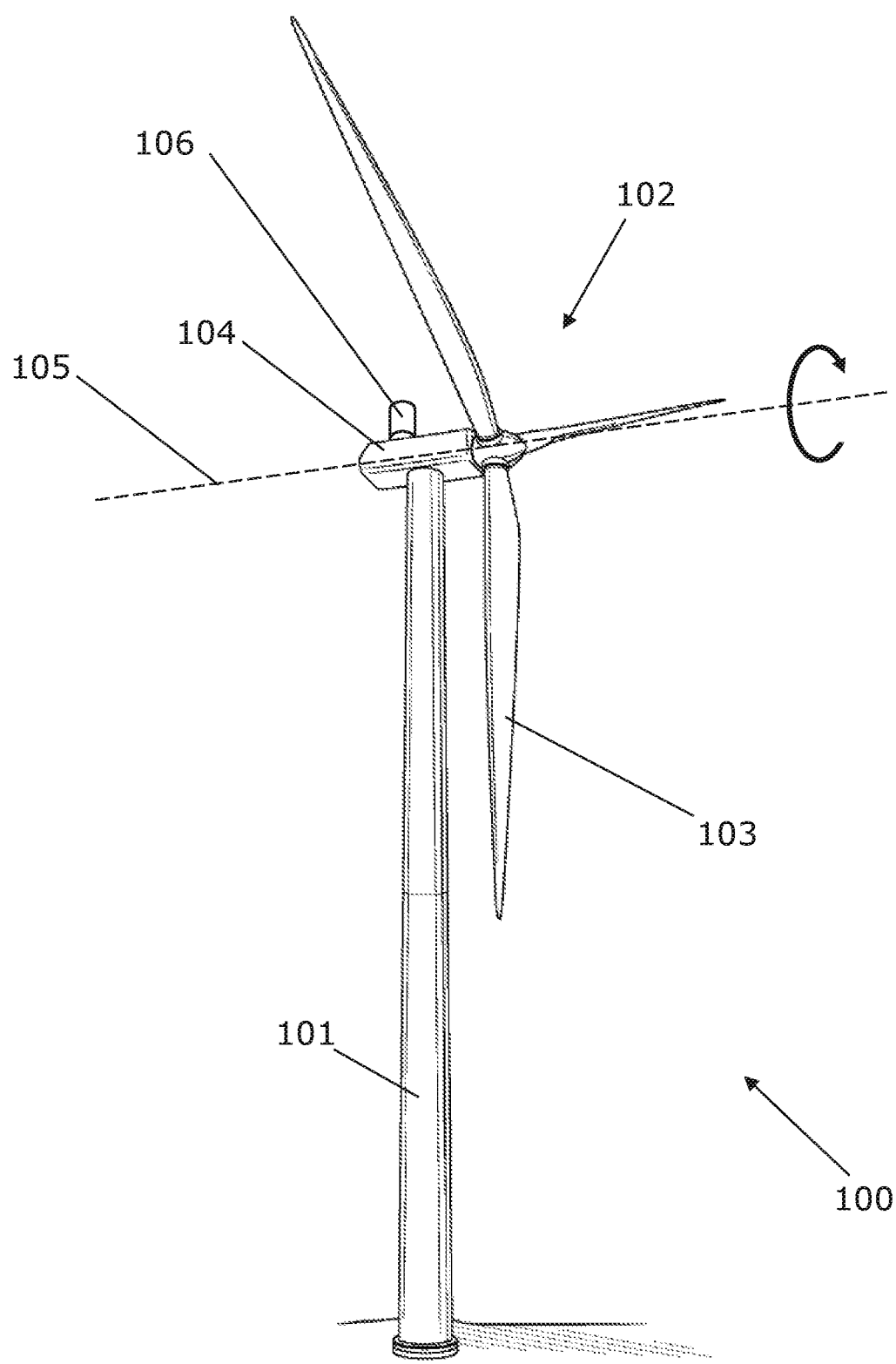
FIG. 1 shows a wind turbine.

FIG. 1 shows a wind turbine 100 according to the fourth aspect, wherein said wind turbine is comprising
- a wind turbine rotor 102 with one or more blades 103, such as three blades,
- a generator configured to be driven by rotational energy of the wind turbine rotor.

In the specific embodiment, the depicted wind turbine 100 (which may also be referred to as a wind turbine generator (WTG)) is also comprising a tower 101. The rotor is connected to a nacelle 104, which is mounted on top of the tower 101 and being adapted to drive a generator situated inside the nacelle. An optical rain gauge 106 is placed on top of the nacelle. The wind turbine rotor 102 is rotatable around a rotor axis 105 by action of the wind. The wind induced rotational energy of the blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g., in order to maximize uptake of the wind energy and to ensure that the rotor blades are not subjected to too large loads when strong winds are blowing. The wind turbine 100 comprises a control system being arranged to determine a pitch signal and may be implemented in a general controller for a wind turbine or a control element, such as a dedicated pitch controller, e.g., where the blades are pitched individually by a pitch system with a pitch force system controlled by a pitch control system, where the pitch force system includes actuators, such as hydraulic actuators, for individually pitching the blades dependent on a pitch signal from the pitch control system, such as the pitch signal comprising one or more individual blade pitch angle control signals corresponding to one or more respective blades.

Figure 2:
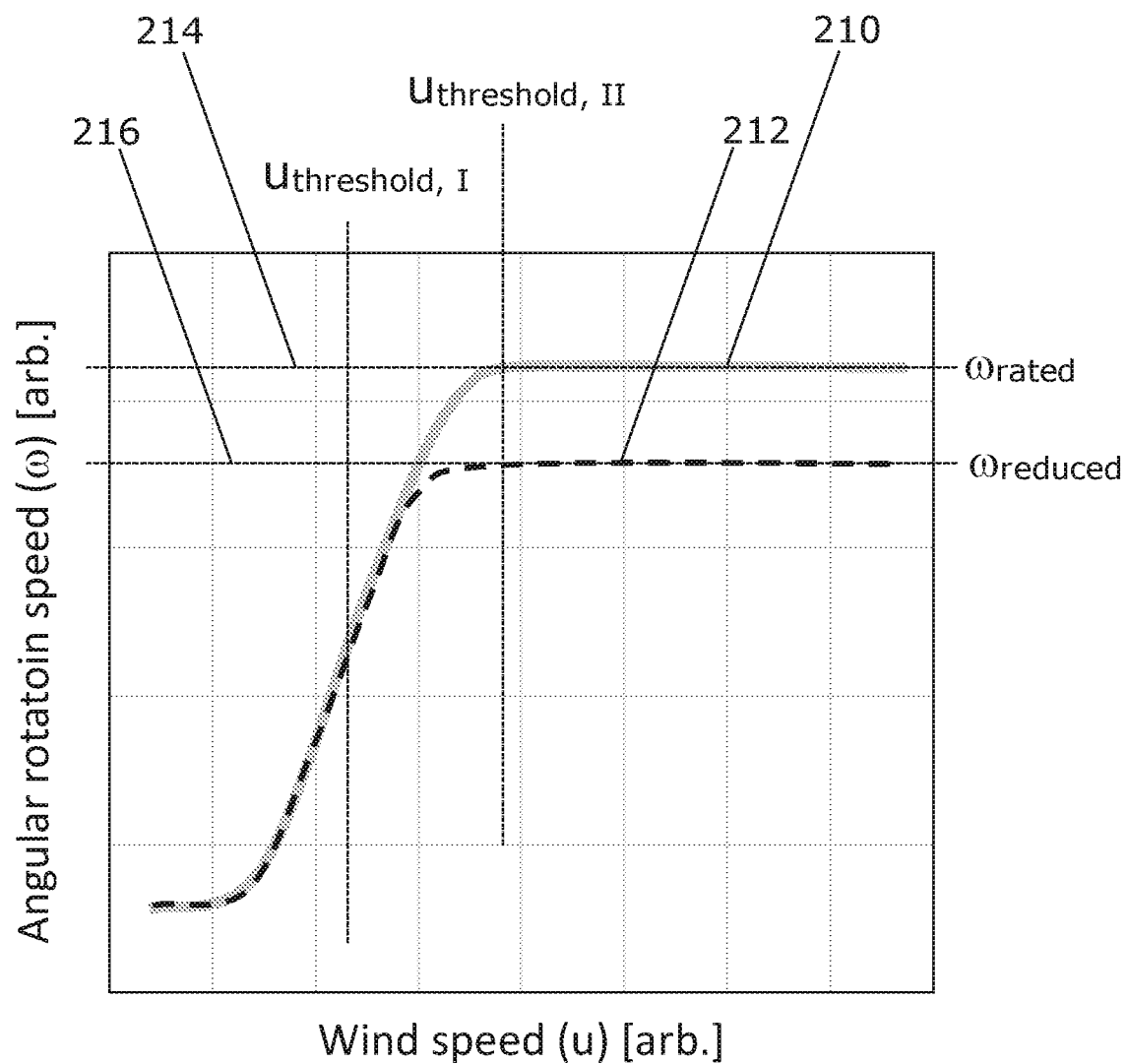
FIG. 2 is a graph with angular rotation speed according to, respectively, normal mode and reduced mode.

FIG. 2 is a graph with angular rotation speed ($\omega$) as a function of wind speed (u), according to, respectively, normal mode and reduced mode. In the normal mode, angular rotation speed (here shown in arbitrary units (arb.), but it could be quantified in, e.g., revolutions per minute (rpm)) is controlled as function of wind speed (here shown in arbitrary units (arb.), but it could be quantified in, e.g., meters/second (m/s)) according to the (full drawn, thick, grey) normal mode curve 210. In the reduced mode, the angular rotation speed is controlled as function of wind speed according to the (dashed, thin, black) reduced mode curve 212.

According to the present embodiment, in case of wind speeds below a certain wind speed value ($u_{threshold, I}$), regardless of whether or not the entry criterion for operation according to a reduced mode is fulfilled, the angular rotation speed of the reduced mode is the same as the normal mode. However, above said certain wind speed ($u_{threshold, I}$) the angular rotation speed is controlled differently in normal mode and reduced mode, and in particular limited by different maximum values, respectively, the rated angular rotation speed ($\omega_{rated}$) as indicated by upper dotted curve 214 and the angular rotation speed threshold ($\omega_{reduced}$) as indicated by lower dotted curve 216. For wind speeds above another certain wind speed value ($u_{threshold, II}$) the angular rotation speed is kept constant at the respective maximum values.

Figure 3:
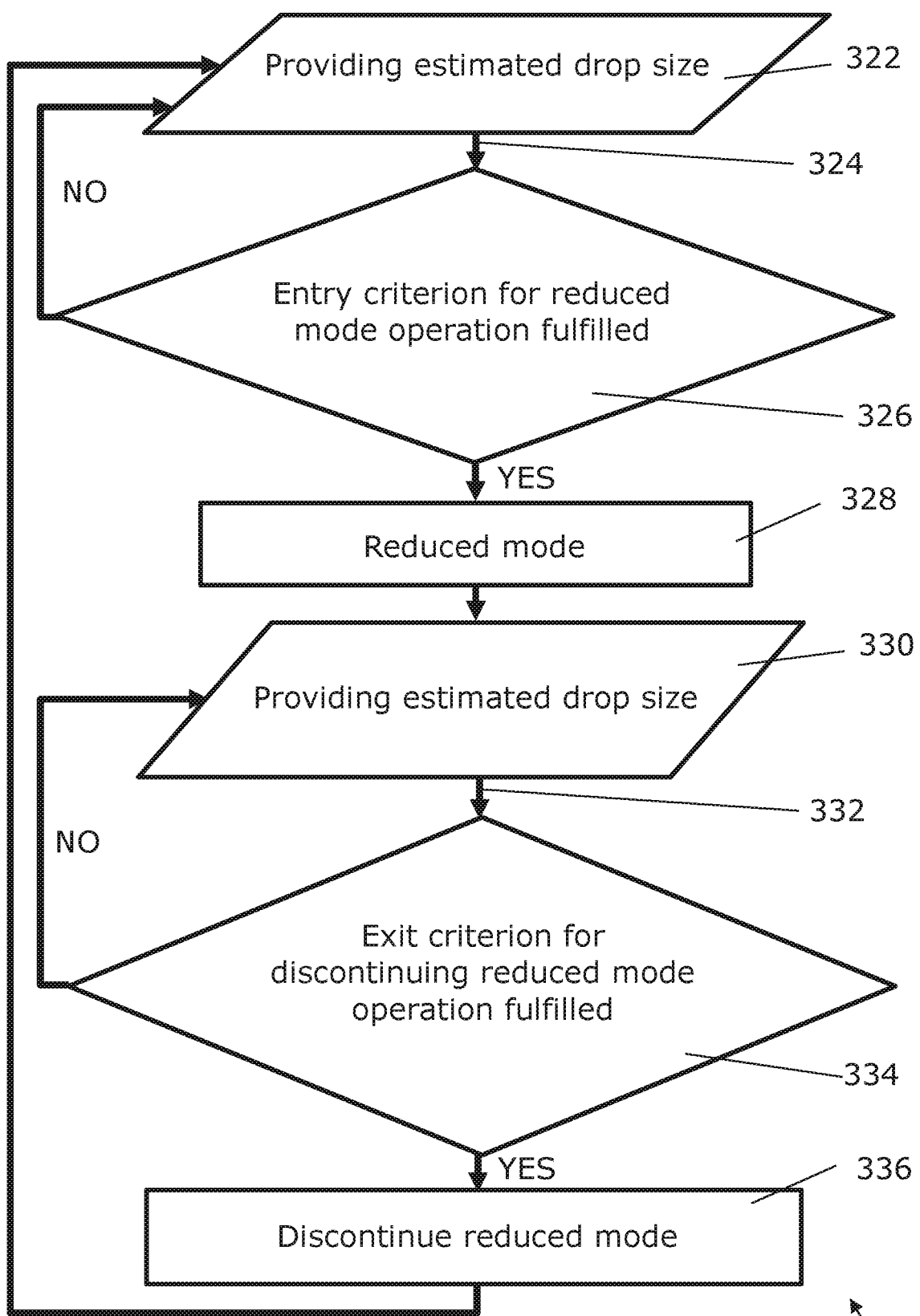
FIG. 3 shows a flow-chart according to an embodiment of the invention.

FIG. 3 shows a flow-chart according to an embodiment of the invention, more particularly a method 320 for controlling a wind turbine 100, such as a method for controlling a wind turbine and minimizing erosion, wherein said wind turbine comprises:
- A wind turbine rotor with one or more blades 103, wherein the wind turbine has a rated angular rotation speed 214 of the wind turbine rotor, said method comprising:
- Providing 322 an estimated drop size 324 of rain drops impinging on the one or more blades,
- Determining 326 whether an entry criterion for operation according to a reduced mode is fulfilled, wherein said determining is based at least partially on the estimated drop size 324,
- Controlling 328 the wind turbine according to the reduced mode if the entry criterion is fulfilled, wherein in the reduced mode an angular rotation speed of the wind turbine rotor is limited below an angular rotation speed threshold 216, wherein the angular rotation speed threshold is smaller than the rated angular rotation speed of the wind turbine.

In the particular embodiment shown, the steps 322-326 may be repeated a plurality of times, such as continuously monitoring the estimated drop size, such as continuously checking if entry criterion for reduced mode operation is fulfilled. It should be understood that for the embodiment taking into account aerial particles broadly the drop size in steps 322 to 336 of the method 320 of FIG. 3 is replaced by aerial particle size (not shown in a separate figure).

According to the embodiment illustrated in the flow-chart the method further comprises
- Controlling 328 the angular rotation speed according to the reduced mode due to the entry criterion having been fulfilled,
- Subsequently (such as subsequent to entering into the reduced mode) providing 330 a subsequently estimated drop size 332 of rain drops impinging on the one or more blades,
- subsequently determining 334 whether an exit criterion for discontinuing reduced mode operation is fulfilled, wherein said subsequently determining is based at least partially on the subsequently estimated drop size 332,
- discontinuing controlling 336 wind turbine according to the reduced mode if the exit criterion is fulfilled, such as if the subsequently estimated drop size 332 is below a predetermined drop size exit threshold.

An advantage of the subsequent steps 330-336 may be that they enable discontinuing operation according to the reduced mode.

In the particular embodiment shown, the steps 330-334 may be repeated a plurality of times, such as continuously adjusting the angular rotation speed based upon the (subsequently) estimated drop size.

The predetermined drop size exit threshold may be similar or different with respect to the predetermined drop size entry threshold.

According to an embodiment there is presented a method, wherein the entry criterion is fulfilled
- if the estimated drop size 324 is above a predetermined drop size entry threshold, and/or
- if the estimated precipitation intensity is above a predetermined precipitation intensity entry threshold.

A possible advantage of this embodiment is the simplicity afforded, while at the same time taking account both precipitation intensity and drop size.

According to an embodiment there is presented a method wherein said angular rotation speed threshold 216 is less than 99%, such as less than 97%, of the rated angular rotation speed. According to an embodiment there is presented a method wherein said angular rotation speed threshold 216 is less than 95%, such as less than 90%, such as less than 85%, such as less than 75%, such as less than 50%, such as less than 25%, of the rated angular rotation speed.

According to an embodiment there is presented a method wherein said drop size is defined as average, such as a running average, rain drop size during a predetermined period of time, such as 10 minutes.

According to an embodiment there is presented a method wherein the predetermined drop size entry threshold is within 0.5-5 mm, such as within 1-3 mm (such as 1 or 2 or 2.15 or 3 mm), such as 1-1.5 mm (such as 1 or 1.27 or 1.5 mm). An advantage of the drop size entry threshold being within 1-1.5 mm may be that it can be shown that when the drop size increases into this range, then there is a large decrease in incubation time. According to an embodiment there is presented a method wherein the predetermined drop size entry threshold is 1 mm.

According to an embodiment there is presented a method wherein said precipitation intensity is defined as an accumulated amount of rainfall per unit of time, which precipitation intensity is measured as height during a predetermined period of time, such as 10 minutes.

According to an embodiment there is presented a method wherein the predetermined precipitation intensity entry threshold is within 1.0-15 mm/hour, such as within 1.0-8.0 mm/hour, such as within 2.0-8.0 mm/hour, such as within 2.00-7.00 mm/hour, such as within 2.0-3.5 mm/hour, such as 2.0 or 2.5 or 2.54 or 2.8 or 3.0 or 3.5 mm/hour. According to an embodiment there is presented a method wherein the predetermined precipitation intensity entry threshold is 2.5 mm/hour.

According to an embodiment there is presented a method further comprising:
  Providing an estimated precipitation intensity of precipitation impinging on the wind turbine 100,
  Providing an estimated rain drop terminal speed, such as a terminal speed with respect to the fixed position of the wind turbine, of rain drops impinging on the wind turbine 100,
  Providing an estimated rain drop impact speed, such as an impact speed relative to the portion of the blade (such as the blade tip) upon which rain drops are impinging, of rain drops impinging on the one or more blades 103,
  Providing an estimated rain drop impact angle of rain drops impinging on the one or more blades 103, wherein the entry criterion is fulfilled if an estimated incubation time is below a predetermined incubation time entry threshold, wherein incubation time $t_{ic}$ is determined according to a formula given as:

$$t_{ic} \text{ (such as in units of hours [hr])} \propto \mathrm{I}^{-1} * I^{\alpha} * V_t^{\beta} * (V * \cos(\theta))^{\gamma} * d^{\zeta}$$

wherein:
  $\propto^{-1}$ denotes an inverse relationship
  $t_{ic}$ (such as in units of hours [hr]) represents incubation time,
  I (such as in units of millimeter/hour [mm/hr]) represents precipitation intensity (accumulated amount of rainfall per time),
  $V_t$ (such as in units of meters per second [m/s]) represents rain drop terminal speed,
  V (such as in units of meters per second [m/s]) represents rain drop impact speed,
  $\theta$ (such as in units of radians [rad]) represents rain drop impact angle,
  d (such as in units of millimeters [mm]) represents rain drop diameter,
  $\alpha$ is a constant, such as 1,
  $\beta$ is a constant, such as −1,
  $\gamma$ is a constant, such as within 6 to 7, such as 6 or 6.05 or 6.7 or 7,
  $\zeta$ is a constant, such as −1 or within 2.3-3.

By 'incubation time' is in this context understood the time after a rainfall starts wherein a weight loss of a material, e.g., of a blade tip, subjected to repeated impingements of rain droplets is no longer insignificant. Thus, there is a period, which may be referred to as incubation period, from the rainfall starts and until the incubation time, wherein the weight loss of the material is insignificant. The constants $\alpha$, $\beta$, $\gamma$, $\zeta$ may take on values such as $(\alpha, \beta, \gamma, \zeta)=(1, -1, 6.7, -1)$ or $(\alpha, \beta, \gamma, \zeta)=(1, -1, 6.5, 2.5)$.

Formulas enabling deriving the formula for incubation time may be found in the book entitled "*Erosion by liquid impact*", by author Springer, George S., publisher Scripta Pub. Co., 1976, which is hereby incorporated by reference in entirety, and reference is in particular made to chapter 1 ("General considerations"), chapter 2 ("Erosion of homogeneous materials") and more particularly TABLE 2-2 with a summary of derived results. An advantage of this embodiment may be that it enables avoiding erosion but simultaneously avoiding unnecessary reduction in power output, and this is achieved by entering into reduced mode if and only if it is necessary for avoiding erosion. The predetermined incubation time entry threshold may be given by a characteristic duration of a rainfall. An advantage of this may be that if the incubation time becomes less than the characteristic duration of a rainfall, then onset of erosion is avoided by entering into reduced mode, but if the incubation time is larger than the characteristic duration of a rainfall, then production can be kept high in the normal mode without onset of erosion.

It may be understood that parameters in the formula may take on different values for different points in time and/or for different positions on the wind turbine. For example, the values may vary depending on azimuthal angle of the rotor and/or for different positions on the blade. According to one embodiment, the incubation time is calculated according to a worst case scenario (such as in order to provide a conservative estimate in order to safeguard the blade structural integrity by avoiding erosion), such as taking the position on the leading edge of the blade (such as the blade tip) which can experience the highest impact velocity and the azimuthal angle which yields the highest impact velocity (such as the angle where the velocity vector of the blade tip is anti-parallel, or closest to anti-parallel, with respect to a velocity vector of the impinging rain drops).

In an embodiment, the predetermined incubation time entry threshold, such as the predetermined incubation time entry threshold calculated for the blade tips, is 8760 hours, such as 4380 hours, such as 2190 hours, such as 1095 hours, such as 500 hours, such as 250 hours, such as 168 hours, such as 100 hours, such as 48 hours, such as 24 hours, such as 12 hours, such as 5 hours, such as 2 hours, such as 1 hour.

According to an embodiment there is presented a method wherein providing 322 an estimated drop size 324 comprises estimating drop size with any one of:
A rain gauge,
An optical rain gauge 106,
an acoustic rain gauge,
a disdrometer, such as a Disdrometer RD-80 (DISTROMET AG, Zumikon, Switzerland),
an acoustic disdrometer, or
a laser drop-sizing gauge.

According to an embodiment there is presented a method wherein providing an estimated precipitation intensity comprises estimating precipitation intensity with any one of:
A rain gauge,
An optical rain gauge 106,
an acoustic rain gauge,
a disdrometer, such as a Disdrometer RD-80 (DISTROMET AG, Zumikon, Switzerland),
an acoustic disdrometer, or
a laser drop-sizing gauge.

An optical rain gauge may have a row of collection funnels. In an enclosed space below each is a laser diode and a photo transistor detector. When enough water is collected to make a single drop, it drops from the bottom, falling into the laser beam path. The sensor is set at right angles to the laser so that enough light is scattered to be detected as a sudden flash of light. The flashes from these photo detectors are then read and transmitted or recorded.

An acoustic rain gauge (also referred to as a hydrophone) may be able to sense the sound signatures for each drop size as rain strikes a water surface within the gauge. Since each sound signature is unique, it is possible to invert the underwater sound field to estimate the drop-size distribution within the rain.

In general, a sensor being any one of a rain gauge, such as an optical or acoustic rain gauge, a disdrometer, such as an acoustic disdrometer, or a laser drop-sizing gauge, may be installed on the wind turbine, such as on top of the nacelle. However, the sensor does not need to be installed on the wind turbine, it could for example be installed next to the wind turbine or on a neighbouring wind turbine.

According to an embodiment the wind turbine 100 further comprises:
a pitch control system for controlling a pitch angle of the one or more blades 103,
and wherein the method further comprises:
controlling the angular rotation speed by controlling the pitch angle of the one or more blades with the pitch control system.

Other ways of controlling angular rotation speed are conceivable, such as via generator torque, which could be employed at least in some instances (for example below rated wind speed).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine comprising a wind turbine rotor with one or more blades, wherein the wind turbine has a rated angular rotation speed of the wind turbine rotor; the method comprising:
providing an estimated drop size of rain drops impinging on the one or more blades,
determining whether an entry criterion for operation according to a reduced mode is fulfilled, wherein said determining is based at least partially on the estimated drop size, and
controlling the wind turbine according to the reduced mode upon determining that the entry criterion is fulfilled, wherein in the reduced mode an angular rotation speed of the wind turbine rotor is limited below an angular rotation speed threshold, and wherein the angular rotation speed threshold is smaller than the rated angular rotation speed of the wind turbine.

2. The method according to claim 1, wherein the entry criterion is fulfilled upon determining the estimated drop size is above a predetermined drop size entry threshold.

3. The method according to claim 1, further comprising providing an estimated precipitation intensity of precipitation impinging on the wind turbine, wherein said determining is based at least partially on said estimated precipitation intensity.

4. The method according to claim 3, wherein the entry criterion is fulfilled upon determining at least one of:
that the estimated drop size is above a predetermined drop size entry threshold, and
that the estimated precipitation intensity is above a predetermined precipitation intensity entry threshold.

5. The method according to claim 4, wherein the predetermined drop size entry threshold is 1 mm.

6. The method according to claim 4, wherein the predetermined precipitation intensity entry threshold is 2.5 mm/hour.

7. The method according to claim 1, wherein the angular rotation speed threshold is less than 95% of the rated angular rotation speed.

8. The method according to claim 1, wherein providing an estimated drop size comprises estimating drop size with any one of:
an optical rain gauge,
an acoustic rain gauge,
a disdrometer, and
a laser drop-sizing gauge.

9. The method according to claim 1, further comprising:
providing an estimated precipitation intensity of precipitation impinging on the wind turbine,
providing an estimated rain drop terminal speed of rain drops impinging on the wind turbine,
providing an estimated rain drop impact speed of rain drops impinging on the one or more blades, and
providing an estimated rain drop impact angle of rain drops impinging on the one or more blades,
wherein the entry criterion is fulfilled upon determining that an estimated incubation time is below a predetermined incubation time entry threshold, and
wherein incubation time $t_{ic}$ is determined according to a formula given as:

$$t_{ic} \propto {}^{-1}I^{\alpha} * V_t^{\beta} * (V*\cos(\theta))^{\gamma} * d^{\zeta}$$

wherein:
$t_{ic}$ represents incubation time,
I represents precipitation intensity (accumulated amount of rainfall per time),
$V_t$ represents rain drop terminal speed,
V represents rain drop impact speed,
θ represents rain drop impact angle,
d represents rain drop diameter,
α is a constant,
β is a constant,
γ is a constant,
ζ is a constant.

10. The method according to claim 9, wherein providing an estimated precipitation intensity comprises estimating precipitation intensity with any one of:
an optical rain gauge,
an acoustic rain gauge,
a disdrometer, and
a laser drop-sizing gauge.

11. The method according to claim 1, further comprising:
controlling the angular rotation speed according to the reduced mode due to the entry criterion having been fulfilled,
subsequently providing a subsequently estimated drop size of rain drops impinging on the one or more blades,
subsequently determining whether an exit criterion for discontinuing reduced mode operation is fulfilled, wherein said subsequently determining is based at least partially on the subsequently estimated drop size, and
discontinuing controlling wind turbine according to the reduced mode upon determining that the exit criterion is fulfilled.

12. The method according to claim 1, wherein the wind turbine further comprises a pitch control system for controlling a pitch angle of the one or more blades; and wherein the method further comprises controlling the angular rotation speed by controlling the pitch angle of the one or more blades with the pitch control system.

13. A computer program product comprising a non-transitory computer readable medium having instructions which, when executed by one or more processors cause a control system for a wind turbine having a rotor with one or more blades to perform an operation; wherein the wind turbine has a rated angular rotation speed of the rotor; wherein the operation comprises:
providing an estimated drop size of rain drops impinging on the one or more blades,
determining whether an entry criterion for operation according to a reduced mode is fulfilled, wherein said determining is based at least partially on the estimated drop size, and
controlling the wind turbine according to the reduced mode upon determining that the entry criterion is fulfilled, wherein in the reduced mode an angular rotation speed of the rotor is limited below an angular rotation speed threshold, and wherein the angular rotation speed threshold is smaller than the rated angular rotation speed of the wind turbine.

14. A wind turbine, comprising:
a tower;
a nacelle disposed on the tower;
a rotor extending from the nacelle, the wind turbine has a rated angular rotation speed of the rotor;
a plurality of blades disposed on an end of the nacelle; and
a control system configured to:
provide an estimated drop size of rain drops impinging on the plurality of blades,
determine whether an entry criterion for operation according to a reduced mode is fulfilled, wherein said determining is based at least partially on the estimated drop size, and
control the wind turbine according to the reduced mode upon determining that the entry criterion is fulfilled, wherein in the reduced mode an angular rotation speed of the rotor is limited below an angular rotation speed threshold, and wherein the angular rotation speed threshold is smaller than the rated angular rotation speed of the wind turbine.

15. A method for controlling a wind turbine, wherein the wind turbine comprises a wind turbine rotor with one or more blades, wherein the wind turbine has a rated angular rotation speed of the wind turbine rotor; the method comprising:
providing an estimated aerial particle size of aerial particles impinging on the one or more blades,
determining whether an entry criterion for operation according to a reduced mode is fulfilled, wherein said determining is based at least partially on the estimated aerial particle size, and
controlling the wind turbine according to the reduced mode upon determining that the entry criterion is fulfilled, wherein in the reduced mode an angular rotation speed of the wind turbine rotor is limited below an angular rotation speed threshold, wherein the angular rotation speed threshold is smaller than the rated angular rotation speed of the wind turbine.

* * * * *